United States Patent [19]

Wazaki et al.

[11] Patent Number: 4,944,358

[45] Date of Patent: Jul. 31, 1990

[54] DRIVING WHEEL SLIP CONTROL SYSTEM FOR VEHICLES

[75] Inventors: Yoshio Wazaki; Tetsuya Oono, both of Wako, Japan

[73] Assignee: Honda Giken Kogyo Kabushiki, Tokyo, Japan

[21] Appl. No.: 326,830

[22] Filed: Mar. 21, 1989

[30] Foreign Application Priority Data

Mar. 23, 1988 [JP] Japan .................................. 63-68700

[51] Int. Cl.$^5$ .............................................. B60K 3/00
[52] U.S. Cl. .................................. 180/197; 123/493; 123/325
[58] Field of Search ................. 180/197; 123/493, 325, 123/326

[56] References Cited

U.S. PATENT DOCUMENTS

| | | | |
|---|---|---|---|
| 4,445,483 | 5/1984 | Hasegawa | 123/492 |
| 4,510,911 | 4/1985 | Itobe | 123/493 |
| 4,581,924 | 4/1986 | Otobe et al. | 123/493 |
| 4,690,117 | 9/1987 | Isobe et al. | 123/493 |
| 4,762,196 | 8/1988 | Harada et al. | 180/197 |
| 4,778,025 | 10/1988 | Sakaguchi et al. | 180/197 |

FOREIGN PATENT DOCUMENTS 48-18695  3/1973  Japan .

*Primary Examiner*—Charles A. Marmor
*Assistant Examiner*—Donn McGiehen

[57] ABSTRACT

A driving wheel slip control system for a vehicle equipped with an internal combustion engine, in which a decelerating condition of the engine is detected, a slip state of the driving wheels is detected, and the torque of the driving wheels is reduced in response to the detected slip state of the driving wheels. The torque reduction is inhibited irrespective of the detected slip state when the decelerating condition of the engine is detected. The engine is determined to be in the decelerating condition when the engine is in a region where the air-fuel ratio of a mixture being supplied to the engine is to be controlled to a value leaner than a stoichiometric ratio.

5 Claims, 4 Drawing Sheets

DRIVING WHEEL SLIP CONTROL SYSTEM FOR VEHICLES

BACKGROUND OF THE INVENTION

This invention relates to a driving wheel slip control system for vehicles, and more particularly to an improvement in such a system, which enables to prevent stalling of an engine installed on the vehicle during deceleration thereof A driving wheel slip control system for vehicles is known, e.g. from Japanese Provisional Patent Publication (Kokai) No. 48-18695, which is adapted to interrupt the fuel supply to the engine to inhibit combustion of the engine, when a predetermined slip state of the driving wheel(s) is detected, to thereby reduce the torque of the driving wheels and hence prevent excessive slip of the driving wheels.

However, this conventional driving wheel slip control system detects the predetermined slip state of the driving wheels based on the driving wheel speed or on the relationship between the driving wheel speed and the trailing wheel speed. Therefore, in the case that only the trailing wheels are in touch with the road surface but the driving wheels are out of touch therewith when the vehicle is running on a rough road, it can be misjudged during deceleration of the engine that the driving wheels are in the predetermined slip state, although the driving wheels actually are not in an excessive slip state, because on this occasion the driving wheel speed becomes higher than the trailing wheel speed since the driving wheels do not undergo a frictional force developed between the driving wheels and the road surface. The misjudgement causes a reduction in the torque of the driving wheels or the engine and hence degraded driveability and even engine stalling.

SUMMARY OF THE INVENTION

It is the object of the invention to provide a driving wheel slip control system for vehicles, which is capable of preventing misjudgement of the slip state of the driving wheels during deceleration of the engine, thereby preventing degraded driveability and engine stalling.

To attain the object, the present invention provides a system for controlling the slip of driving wheels of a vehicle equipped with an internal combustion engine, including deceleration detecting means for detecting a decelerating condition of the engine, slip detecting means for detecting a slip state of at least one of the driving wheels, and torque reducing means operable in response to output from the slip detecting means for reducing the torque of the driving wheels.

The system according to the invention is characterized by an improvement comprising inhibiting means for inhibiting operation of the torque reducing means irrespective of the output from the slip detecting means when the decelerating condition of the engine is detected by the deceleration detecting means.

Preferably, the deceleration detecting means determines that the engine is in the decelerating condition when the engine is in a region where the air-fuel ratio of a mixture being supplied to the engine is to be controlled to a value leaner than a stoichiometric ratio.

More preferably, the system is associated with a fuel supply control system which controls the air-fuel ratio of an air-fuel mixture being supplied to the engine by correcting a basic control value by correction coefficients and correction variables, and the deceleration detecting means determines that the engine is in the decelerating condition when a correction coefficient for leaning the air-fuel ratio of the air-fuel mixture is smaller than a predetermined value not correcting the basic control value.

Also preferably, the torque reducing means reduces the torque of the driving wheels by interrupting the supply of fuel to the engine if a magnitude of slip of the at least one of the driving wheels is greater than a predetermined value, when the operation thereof is not inhibited by the inhibiting means.

The above and other objects, features, and advantages of the invention will be more apparent from the ensuing detailed description &taken in conjunction with the accompanying drawings.

DETAILED DESCRIPTION

The invention will now be described in detail with reference to the drawings showing an embodiment thereof.

Figure 1:
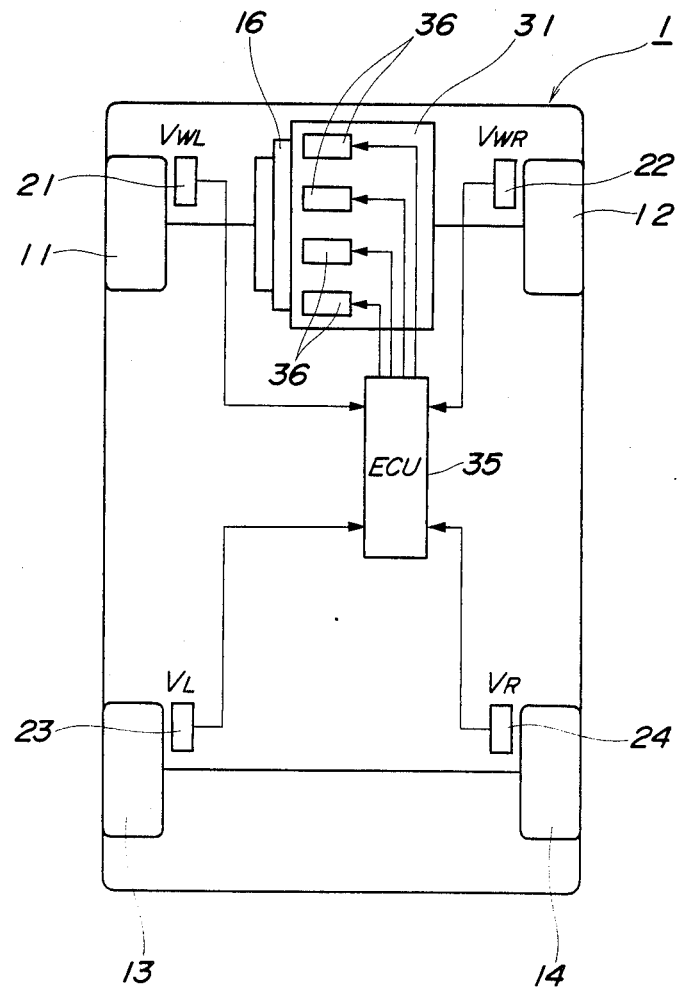
FIG. 1 is a schematic diagram showing the construction of a vehicle equipped with a driving wheel slip control system according to the invention.

Referring first to FIG. 1, there is shown a vehicle 1 equipped with a driving wheel slip control device according to the invention. The vehicle 1 is a front wheel drive type with front wheels 11 and 12 as driving wheels which are driven by an internal combustion engine 31 via a transmission 16, and rear wheels 13 and 14 as driven or trailing wheels. Further, the invention could be similarly applied to a rear wheel drive type vehicle. The driving wheels 11, 12 and trailing wheels 13, 14 are provided, respectively, with driving wheel speed sensors 21, 22 and trailing wheel speed sensors 23, 24. The driving wheel speed sensors 21, 22 sense the rotational speeds $V_{WL}$ and $V_{WR}$ of the respective left and right driving wheels, and the trailing wheel speed sensors 23 and 24 sense the rotational speeds $V_L$ and $V_R$ of the respective left and right driven wheels. Output signals from these sensors are delivered to an electronic control unit (hereinafter referred to as "the ECU") 35. In the present embodiment. the ECU 35 forms deceleration detecting means for detecting a decelerating condition of the engine, slip detecting means for detecting the slip state of the driving wheels, torque reducing means for reducing the torque of the driving wheels, and inhibiting means for inhibiting operation of the torque reducing means.

In the ECU 35, the driving wheel speed $V_{WL}$ or $V_{WR}$ is selected as the driving wheel speed $V_W$, and the trailing wheel speed $V_L$ or $V_R$ on the same side as the selected driving wheel is selected as the vehicle speed V. The ECU 35 controls the torque of the driving wheels 11 and 12 by controlling the output of the engine 31 by means of a fuel supply control system, described hereinafter, thereby controlling the slip state of the driving wheels 11 and 12.

Figure 2:
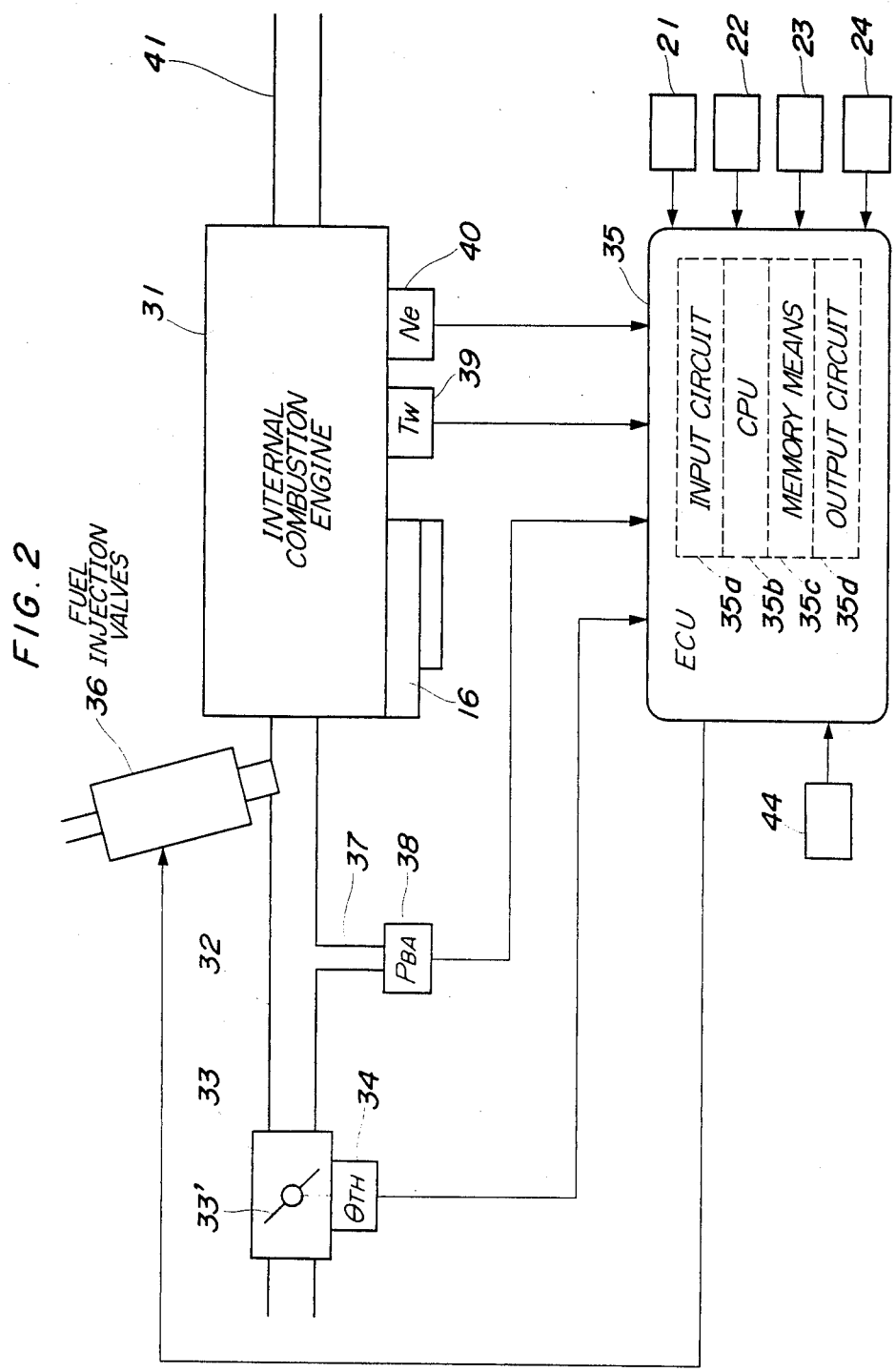
FIG. 2 is a schematic diagram showing a fuel supply control system for controlling engine output, which is associated with the driving slip control system.

In FIG. 2, the entire arrangement of the fuel supply control system is shown, which controls the fuel supply to the engine 31 which may be a six cylinder type, for instance. Connected to the engine 31 are an intake pipe 32 at a location upstream thereof, and an exhaust pipe 41 at a location downstream thereof. A throttle body 33 is arranged across the intake pipe 32, accommodating a throttle valve 33' therein. A throttle valve opening $\theta_{TH}$ sensor 34 is connected to the throttle valve 33' for supplying an electrical signal indicative of the sensed throttle valve opening $\theta_{TH}$ to the ECU 35.

Fuel injection valves 36, only one of which is shown, are inserted into the in&ake pipe 32 at locations intermediate between the cylinder block of the engine 31 and the throttle body 33 and slightly upstream of respective intake valves, not shown. The fuel injection valves 36 are connected to a fuel pump and a fuel source, neither of which is shown, and electrically connected to the ECU 35 to have their valve opening periods controlled by signals therefrom.

On the other hand, an intake pipe absolute pressure $P_{BA}$ sensor 38 is provided in communication with the interior of the intake pipe 32 via a conduit 37 a location immediately downstream of the throttle body 33, for supplying an electrical signal indicative of the sensed absolute pressure $P_{BA}$ within the intake pipe 32 to the ECU 35.

An engine coolant temperature $T_W$ sensor 39, which may be formed of a thermister or the like, is mounted in the cylinder block of the engine 35 which is filled with engine coolant, for supplying an electrical signal indicative of the sensed coolant temperature $T_W$ to the ECU 35. An engine rotational speed Ne sensor 40 is arranged in facing relation to a camshaft or a crankshaft of the engine 35, neither of which is shown. The engine rotational speed Ne sensor 40 generates a crank angle position signal pulse (hereinafter referred to as "TDC signal pulse(s)") at a predetermined crank angle position whenever the engine crankshaft rotates through 120 degrees, the predetermined crank angle position being at a predetermined angle before top dead center (TDC) at the beginning of the intake stroke of each cylinder. The TDC signal pulses are supplied to the ECU 35.

Further connected to the ECU 35 are other engine operating parameter sensors 44 for supplying electrical signals indicative of the sensed values of the other engine operating parameters to the ECU 35.

The ECU 35 comprises an input circuit 35a having functions of shaping the waveforms of input signals from various sensors, shifting the voltage levels of input signals from analog output sensors to a predetermined level, converting the level-shifted analog signal to digital signals, and so forth, a central processing unit (hereinafter called "the CPU") 35b, memory means 35c storing various operational programs which are executed in the CPU 35b and storing results of calculations therefrom, etc., and an output circuit 35d which outputs driving signals to the fuel injection valves 36.

In response to input signals from various sensors, the CPU 35b calculates the valve opening period or fuel injection period $T_{OUT}$, over which the fuel injection valves 36 are to be opened, by the use of the following equation (1), in synchronism with inputting of TDC signal pulses to the ECU 35.

$$\text{TOUT} = T_i \times K_{LS} \times K_1 + K_2 \quad (1)$$

where $T_i$ represents a basic value of the fuel injection period $T_{OUT}$, which is read e.g. from a $T_i$ map, not shown, stored in the memory 35c as a function of the engine rotational speed Ne and the intake pipe absolute pressure $P_{BA}$.

$K_{LS}$ represents a mixture-leaning coefficient set at a predetermined value smaller than 1.0, which is applied while the engine 31 is in an operating region (leaning region) in which the mixture air-fuel ratio is leaned, i.e. while the engine 31 is in a predetermined decelerating region in which load on the engine 31 is smaller than that at the time the engine is in a normal operating region wherein the air-fuel ratio of an air-fuel mixture being supplied to the engine 31 is to be controlled to a stoichiometric ratio (e.g. 14.7), such as when the vehicle 1 is cruising. The leaning region is described in detail in U.S. Pat. No. 4,445,483 owned by the assignee of the present application. The leaning region includes a fuel cut region in which the fuel supply to the engine 31 is interrupted.

K1 and K2 are other correction coefficients and correction variables, respectively, which are calculated based upon various engine operating parameter signals to such values as to optimize characteristics of the engine such as fuel consumption and accelerability depending on operating conditions of the engine.

The CPU 35b supplies through the output circuit 35d the fuel injection valves 36 with driving signals indicative of the calculated fuel injection period $T_{OUT}$ determined as above, over which the fuel injection valves 36 are to be opened.

Figure 3:
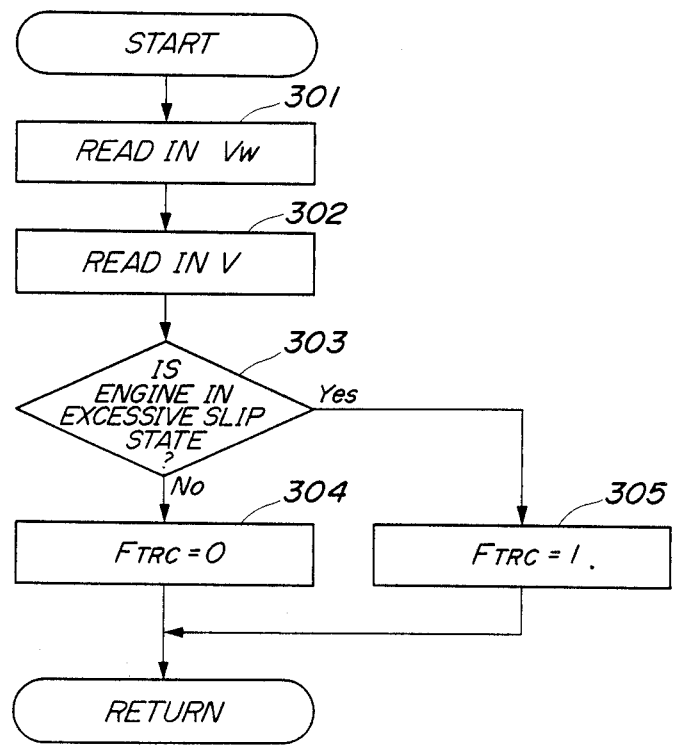
FIG. 3 is a flowchart of a subroutine for determining an excessive slip state of the driving wheels.

FIG. 3 shows a subroutine for determining whether or not excessive slip is created with respect of the driving wheels 11 and 12. This program is executed whenever a predetermined constant time period elapses.

First, the driving wheel speed $V_W$ is determined based on signals from the driving wheel speed sensors 1 and 22 at a step 301, and then the vehicle speed V is determined based on signals from the vehicle speed sensors 23 and 24 at a step 302. At the next step 303 it is determined whether or not the driving wheels 11 and 12 undergo the excessive slip. The determination as to whether the excessive slip takes place may be carried out by various methods, e.g. by determining whether or not the driving wheel speed $V_W$ determined at the step 301 is higher than a predetermined reference speed $V_R$ calculated by the use of a predetermined equation, not shown, in response to the vehicle speed V determined at the step 302, or by determining whether Or not a slip rate $\lambda$ determined based on the driving wheel speed $V_W$ and the vehicle speed V is larger than a predetermined reference slip rate $\lambda_R$ (e.g. 15%).

If the answer to the question at the step 303 is No, that is, if the excessive slip does not take place, a flag $F_{TRC}$ is set to a value of 0 at a step 304, whereas if the answer is Yes, that is, if the excessive slip takes place, a flag $F_{TRC}$ is set to a value of 1 at a step 305, followed by terminating the present program.

Figure 4:
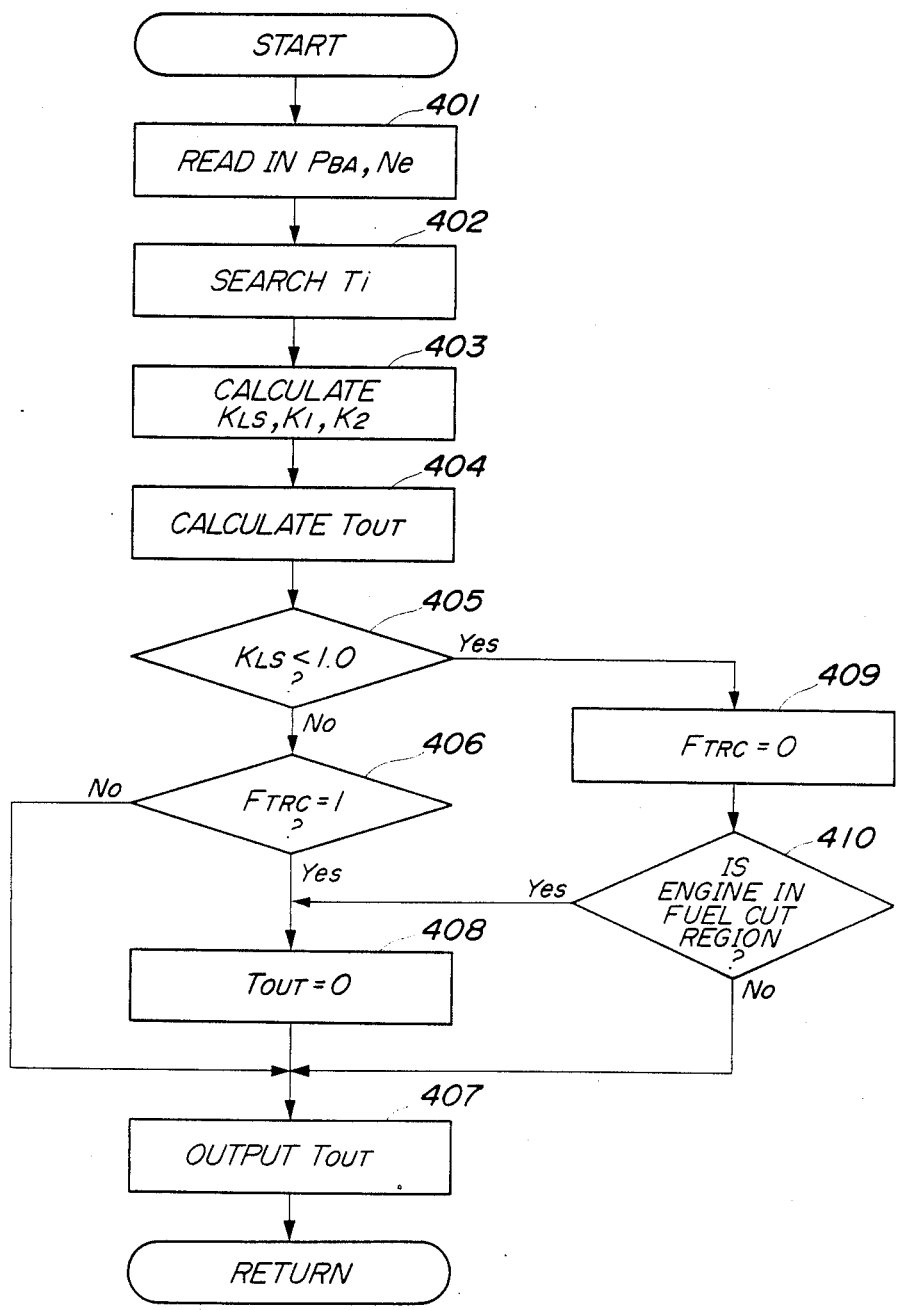
FIG. 4 is a flowchart of a subroutine for controlling the supply of fuel to the engine and the interruption of same.

FIG. 4 shows a subroutine for controlling the supply and cut of fuel to the engine 31 and the interruption of same (fuel cut). This program is executed in synchronism with inputting of each TDC signal pulse to the ECU 35.

At a step 401, various engine operating parameter signals are read in, which are supplied from such sensors as the intake pipe absolute pressure $P_{BA}$ sensor 38 and the engine rotational speed Ne sensor 40, and then the basic value $T_i$ of the fuel injection period $T_{OUT}$ is read e.g. from the $T_i$ map, as described above, at a step 402 in response, e.g. to $P_{BA}$ and Ne of the engine operating parameter signals read in at the step 401. At the next step 403, the mixtureleaning coefficient $K_{LS}$, the correction coefficients K1, and the correction variables K2 are calculated. Then, the fuel injection period $T_{OUT}$ for the fuel injection valves 36 is calculated at a step 404 by the use of the equation (1) into which the values $T_i$, $K_{LS}$, K1 and K2 calculated at the step 403 have been substituted.

At a step 405, it is determined whether or not the value $K_{LS}$ calculated at the step 403 is blow 1.0. If the answer is No, that is, if the engine 31 is not in the decelerating condition, it is determined at a step 406 whether or not the flag $F_{TRC}$ set by the subroutine of FIG. 3 is equal to the value of 1. If the answer is No, that is, if the driving wheels 11 and 12 do not undergo the excessive slip, the program proceeds to a step 407. where a driving signal corresponding to the fuel injection period $T_{OUT}$ calculated at the step 404 is supplied to the fuel injection valves 36, so that the fuel injection valves 36 inject fuel into the engine 31 over the calculated fuel injection period $T_{OUT}$, followed by termination of the program.

If the answer to the question at the step 406 is Yes, that is, if the driving wheels 11 and 12 undergo the excessive slip, the fuel injection period $T_{OUT}$ is reset to a value of 0 at a step 408, followed by execution of the step 407 to terminate the program. That is, if the engine 31 is not in the decelerating condition, and at the same time the driving wheels 11 and 12 undergo the excessive slip, fuel cut is carried out to reduce the torque of the driving wheels 11 and 12, thereby preventing the driving wheels 11 and 12 from undergoing excessive slip.

If the answer to the question at the step 405 is Yes, that is, if $K_{LS}<1.0$ holds, indicating that the engine 31 is in the leaning or decelerating region, the flag $F_{TRC}$ is reset to the value Of 0 at a step 409, followed by the program proceeding to a step 410 where it is determined whether or not the engine 31 is in the fuel cut region within the leaning region. If the answer is Yes, that is, if the engine 31 is in the fuel cut region, the steps 408 and 407 are executed to effect fuel out, whereas if the answer is No, that is, if engine 31 is not in the fuel cut region, the step 407 is executed to inject fuel into the engine 31 over the fuel injection period $T_{OUT}$ calculated at the step 404.

Thus, when the engine 3i is in the decelerating condition, fuel cut is not carried out irrespective of whether or not the driving wheels 11 and 12 undergo the excessive slip, so long as the engine 31 is not in the fuel cut region. Therefore, according the invention it is possible to prevent misjudgement as to the excessive slip state of the driving wheels, which can be made while the vehicle is running on the rough road with its engine being in the decelerating condition.

Although, in the embodiment described above, the determination as to whether or not the engine is in the decelerating condition is carried out based on the value of the mixture-leaning coefficient $K_{LS}$, alternatively the determination may be carried out based on whether Or not a change rate $\Delta\theta_{TH}$ of the throttle valve opening or a change rate $\Delta P_{BA}$ of the intake pipe absolute pressure is below a predetermined value indicative of the decelerating condition of the engine.

What is claimed is:

1. In a system for controlling the slip of driving wheels of a vehicle equipped with an internal combustion engine, including deceleration detecting means for detecting a decelerating condition of said engine, slip detecting means for detecting a slip state of at least one of said driving wheels, and torque reducing means operable in response to output from said slip detecting means for reducing the torque of said driving wheels,
the improvement comprising inhibiting means for inhibiting operation of said torque reducing means irrespective of the output from said slip detecting means when said decelerating condition of said engine is detected by said deceleration detecting means.

2. A system as claimed in claim 1, wherein said deceleration detecting means determines that said engine is in said decelerating condition when said engine is in a region where the air-fuel ratio of a mixture being supplied to said engine is to be controlled to a value leaner than a stoichiometric ratio.

3. A system as claimed in claim 1 or 2, associated with a fuel supply control system which controls the air-fuel ratio of an air-fuel mixture being supplied to said engine by correcting a basic control value by correction coefficients and correction variables, and wherein said deceleration detecting means determines that said engine is in said decelerating condition when a correction coefficient for leaning the air-fuel ratio of the air-fuel mixture is smaller than a predetermined value not correcting said basic control value.

4. A system as claimed in claim 1 or 2, wherein said torque reducing means reduces the torque of said driving wheels by interrupting the supply of fuel to said engine.

5. A system as claimed in claim 1 or 2, wherein said torque reducing means reduces the torque of said driving wheels if a magnitude of slip of said at least one of said driving wheels is greater than a predetermined value, when the operation thereof is not inhibited by said inhibiting means.

* * * * *

UNITED STATES PATENT AND TRADEMARK OFFICE
CERTIFICATE OF CORRECTION

PATENT NO. : 4,944,358
DATED : July 31, 1990
INVENTOR(S) : WAZAKI et al

It is certified that error appears in the above-identified patent and that said Letters Patent is hereby corrected as shown below:

On the title page, Item [73] "Honda Giken Kogyo Kabushiki" should read --Honda Giken Kogyo Kabushiki Kaisha--.

Signed and Sealed this

Nineteenth Day of May, 1992

Attest:

DOUGLAS B. COMER

Attesting Officer

Acting Commissioner of Patents and Trademarks